United States Patent [19]
Smith

[11] Patent Number: 6,128,376
[45] Date of Patent: Oct. 3, 2000

[54] CHANGE OF EQUAL ACCESS CARRIER NOTIFICATION

[75] Inventor: David B. Smith, Hinsdale, Ill.

[73] Assignee: Lucent Technologies Inc., Murray Hill, N.J.

[21] Appl. No.: 08/915,516

[22] Filed: Aug. 13, 1997

Related U.S. Application Data

[63] Continuation of application No. 08/365,616, Dec. 28, 1994.

[51] Int. Cl.[7] .................................................. H04M 3/493
[52] U.S. Cl. ...................... 379/201; 379/88.23; 379/111
[58] Field of Search ................................ 379/67.1, 88.23,
379/88.24, 88.25, 111, 243, 244, 201, 112,
113, 114, 115, 219, 220, 221

[56] References Cited

U.S. PATENT DOCUMENTS

| | | | |
|---|---|---|---|
| 3,909,543 | 9/1975 | Miller | 379/92 |
| 4,791,666 | 12/1988 | Cobb et al. | 379/213 |
| 5,287,403 | 2/1994 | Atkins et al. | 379/123 |
| 5,309,505 | 5/1994 | Szlam et al. | 379/88 |
| 5,375,161 | 12/1994 | Fuller et al. | 379/210 |
| 5,381,466 | 1/1995 | Shibayama et al. | 379/88 |
| 5,515,425 | 5/1996 | Penzias et al. | 379/114 |
| 5,586,338 | 12/1996 | Lynch et al. | 455/54.1 |

OTHER PUBLICATIONS

Method for Informing Callers of Forwarded Telephone, IBM Technical Disclosure Bulletin, Oct. 1993, vol. 36, Issue No. 10 pp. 353–354.

"The Voice of Experience in Computer Telephony", Span Link Communications, Publication Date=Unknown.

*Primary Examiner*—Scott L. Weaver
*Attorney, Agent, or Firm*—Mony R. Ghose

[57] ABSTRACT

An arrangement for routing the possibility of switching telephone users to another preferred carrier without the intent of the telephone user. When a record has been made in a data base indicating a change of preferred carrier, the telephone user is provided with an announcement indicating the change when the user makes a toll call. In accordance with one embodiment of the invention the user simply is informed and if the user wants to undo the change the user contacts the local carrier. In accordance with another embodiment the user is provided with a validation code and must enter the validation code in order to effect the change of carriers. In accordance with another embodiment the user is provided with a number of options including the keying of a request to effect the change of carrier, or cancel the change of carrier. Advantageously, users are informed of a change of carrier before they make any calls using the new carrier and before they receive any telephone bills identifying the change.

11 Claims, 5 Drawing Sheets

FIG. 5

CUSTOMER DATA

| ANI | OLD PREFERRED CARRIER | NEW PREFERRED CARRIER |
|---|---|---|
| NUMBER OF ANNOUNCEMENTS | DATE OF CHANGE | DATE OF ACCEPTANCE |
| STATUS OF CHANGE | CODE FOR CHANGE | |

CHANGE OF EQUAL ACCESS CARRIER NOTIFICATION

This application is a continuation of application Ser. No. 08/365,616, filed on Dec. 28, 1994.

TECHNICAL FIELD

This invention relates to arrangements for informing customers of a change of service or service provider.

Problem

In an exemplary problem situation telephone customers are allowed to select a preferred in exchange carrier to serve toll calls for which the caller does not supply a specific per call selection of a carrier. The selected carrier is effectively a preferred carrier used in default of a specific indication on the call of which carrier is to carry the call. Provision of telephone toll services is a highly competitive business and the competitors try very hard to attract customers into selecting them as the preferred toll carrier. In practice, the preferred toll carrier carries a very large majority of the calls initiated by a typical customer so that the selection is equivalent to attracting most of the toll business generated by the customer. This situation has led to various types of abuse whereby callers are switched to a different toll carrier without having a true intent to make the switch. Sometimes this switch is made as a result of deliberate or good faith misunderstanding of the switched caller's intentions and sometimes the switch is made as a result of trickery. An example of the latter is a case in which callers are given vouchers for some nominal amount (perhaps 10 dollars) and in signing the endorsement of the voucher they sign a statement, frequently in small print, that they wish to be transferred to a particular toll carrier.

A specific problem of the prior art therefore is that changes in the preferred carrier for providing toll telephone service can be made without a customer having a true intention to have such a change made and frequently, the customer is not specifically informed that a change is being, or has been made. A more general problem is that a switch of type of service provider or type of service in any of a number of fields are made without the true intent and consent of the party allegedly requesting the change. Examples of service providers include local toll provider, wireless service provider, cable TV program supplier, preferred electric power or gas supplier, or appliance maintenance service supplied from a common referral service. Examples of services in the field of telephony include a service wherein a customer receives a discount based on length of service with a provider or receives a discount on all calls of a type in return for a flat fee paid every month, a different local calling plan (e.g., expanded flat rate service), custom calling features (call waiting, call forwarding, three-way calling), voice mail services, and home wire service (Ameritech's Line Backer®).

Solution

The above problem is substantially alleviated and a contribution is made to the art in accordance with applicant's invention wherein customers are notified at the time of use of a service that the provider or the type of service has been changed or is about to be changed. Advantageously, the customer receives such notification at a time when the customer is about to use the service and usually away from sources of sales pressure.

In accordance with one aspect of the invention a customer receives an announcement of the change for a definable period of time and/or a definable number of uses of the service. This ensures that the customer has ample opportunity to cancel an apparent or alleged request.

In accordance with another aspect of the invention, a new service provider or the provider of the changed service supplies the customer with a positive validation number and the service provider is not changed or the new type of service is not activated until the customer supplies the number. In accordance with one preferred embodiment, the customer supplies the number in response to a request from the telecommunication network at a time when the customer is requesting the service. Advantageously, such an arrangement gives a high degree of protection against false activation of a request to change service or to change service provider.

In accordance with another aspect of the invention the customer who receives the announcement is given an option to indicate one of a number of courses of action including validation of the proposed change, cancellation of the proposed change, deferral of a decision on the proposed change or the option of talking to a customer service representative. The customer service representative can be selectable to be a representative of the old service provider or the new service provider. Advantageously, such an arrangement gives the customer a simple way of validating or canceling a request.

In accordance with another aspect of the invention customers are simply given an announcement of a change and optionally provided with a telephone number to call in case they have any questions or wish to cancel the change.

The arrangement can be used for offering customers a trial service, and for notifying the customers of a renewal period, because the customers are informed of the service and because they have the ability to validate or cancel the service.

BRIEF DESCRIPTION OF THE DRAWING

FIG. 5 is a layout of customer data in an equal access data base for implementing applicant's invention.

DETAILED DESCRIPTION

Figure 1:
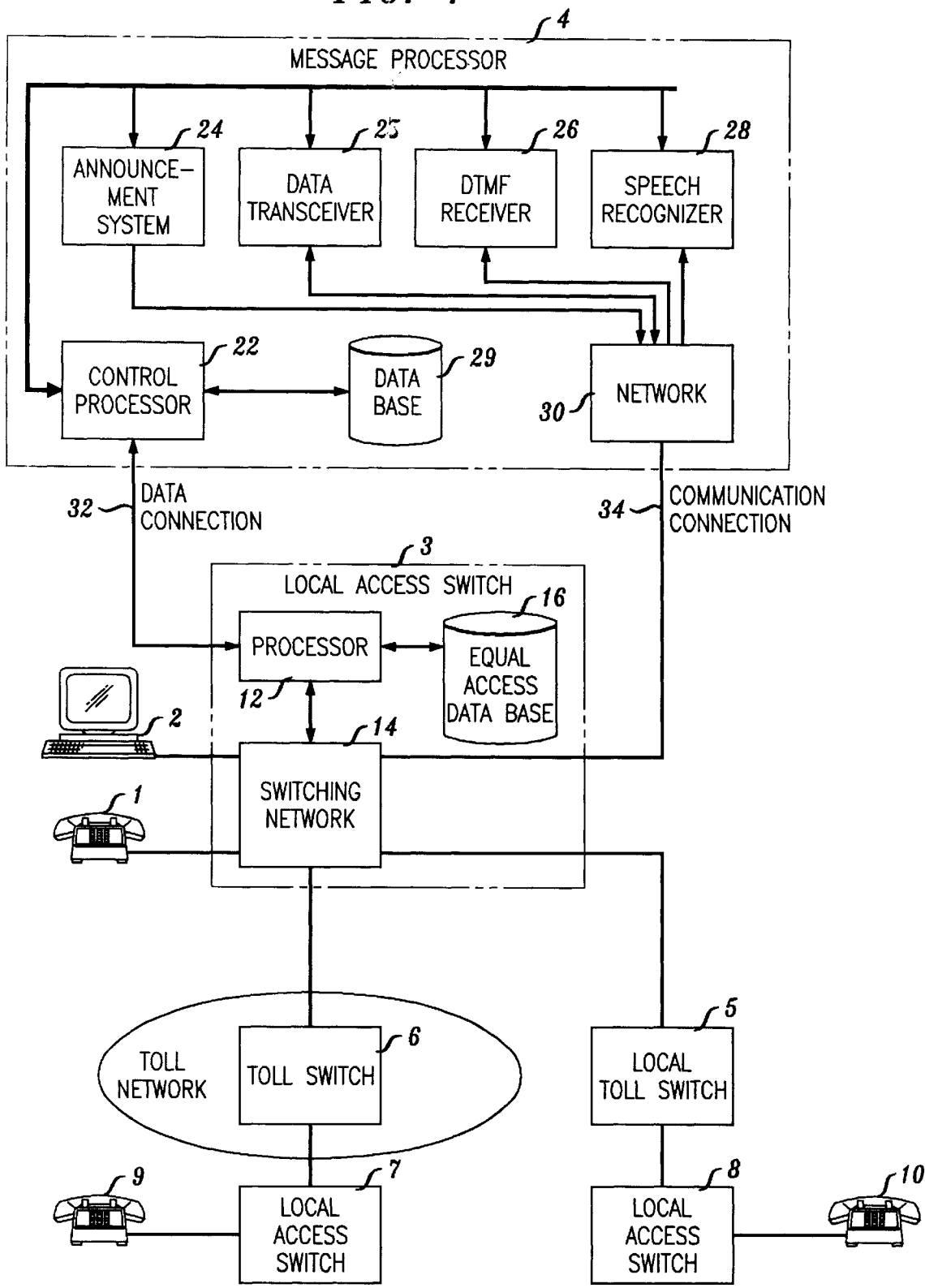
FIG. 1 is a block diagram illustrating the operation of applicant's invention.

FIG. 1 is a block diagram illustrating the operation of applicant's invention. Telephone station 1 and telecommunications terminal 2 are both connected to a local access switch 3. Either of these stations may receive announcements although the announcement to station 1 is likely to be oral whereas the announcement to station 2 may be in the form of data for controlling a video display. Local access switch 3 is connected to a message processor 4 for supplying announcements and to the caller and accepting control instructions from the caller. Local access switch 3 is also connected to a local toll switch 5 which is connected to another local access switch 8 for completion of local toll calls, for example telephone station 1 and a telephone station 10 connected to local access switch 8.

Local access switch 3 is also connected to a toll switch 6 possibly via toll access switch (not shown) and the toll switch 6 is connected to another local access switch 7 (possibly via a toll access switch, not shown) which local access switch is connected to a telephone 9 for completion of interexchange area toll calls between, for example, telephones 1 and 9.

Local access switch 3 includes a processor 12 for controlling a switching network 14 and accessing an equal access data base 16. The switching network is used for connecting callers to each other or to the telecommunications network for completion of calls to telephone stations or terminals connected to other switching systems. The equal access data base contains data for identifying an interexchange toll carrier for use in completing telephone interexchange toll telephone calls when the caller does not specifically request the use of a interexchange carrier (a caller can request that a particular interexchange carrier be used on a particular call by dialing a prefix of 10 followed by a three or four digit identification of the interexchange carrier followed by the telephone number of the destination). The object of the equal access data base is to allow each customer to specify a preferred toll carrier so that calls may be completed using this prespecified toll carrier without requiring the customer to dial additional information to specify such a carrier. Note that while the preferred embodiment is described in terms of interexchange carrier selection the same principles can be used for selecting a preferred local exchange area toll carrier or a preferred supplier of video services. Note further that while the specific embodiment shows the equal access data base as being within local access switch 3, in other embodiments, a centralized equal access data base, shared by many switches is used instead.

The message processor comprises a control processor 22 and an announcement system 24, data transceiver 25, dual tone multifrequency receivers 26, speech recognition circuits 28 and a data base 29. Any of the blocks 24, 25 26 or 28 are connectable via a small switching network 30 to communications connection 34 to local access switch 3. In addition the control processor 22 is connected via data link 32 with the processor of the local access switch 12. The message processor may supply announcements to the caller through an announcement system 24, data for controlling a display through the data transceiver 25 and may detect from the caller data signals in the data transceiver 25, dual tone multifrequency signals in DTMF receivers 26 or speech signals in speech processor 28. The announcement system can be programmed to respond to user input to provide multi-lingual responses. Speech processor 28 may be used for example in communicating with dial telephones which generate signals that cannot pass through the telecommunications network; if such telephones are connected to local access switch 3 via an intermediate switching system, then dial signals cannot be received in local access switch 3. Data base 29 provides data for the types of announcements or data to be transmitted back to callers and would include any customized announcements for specific service providers or services.

Figure 2:
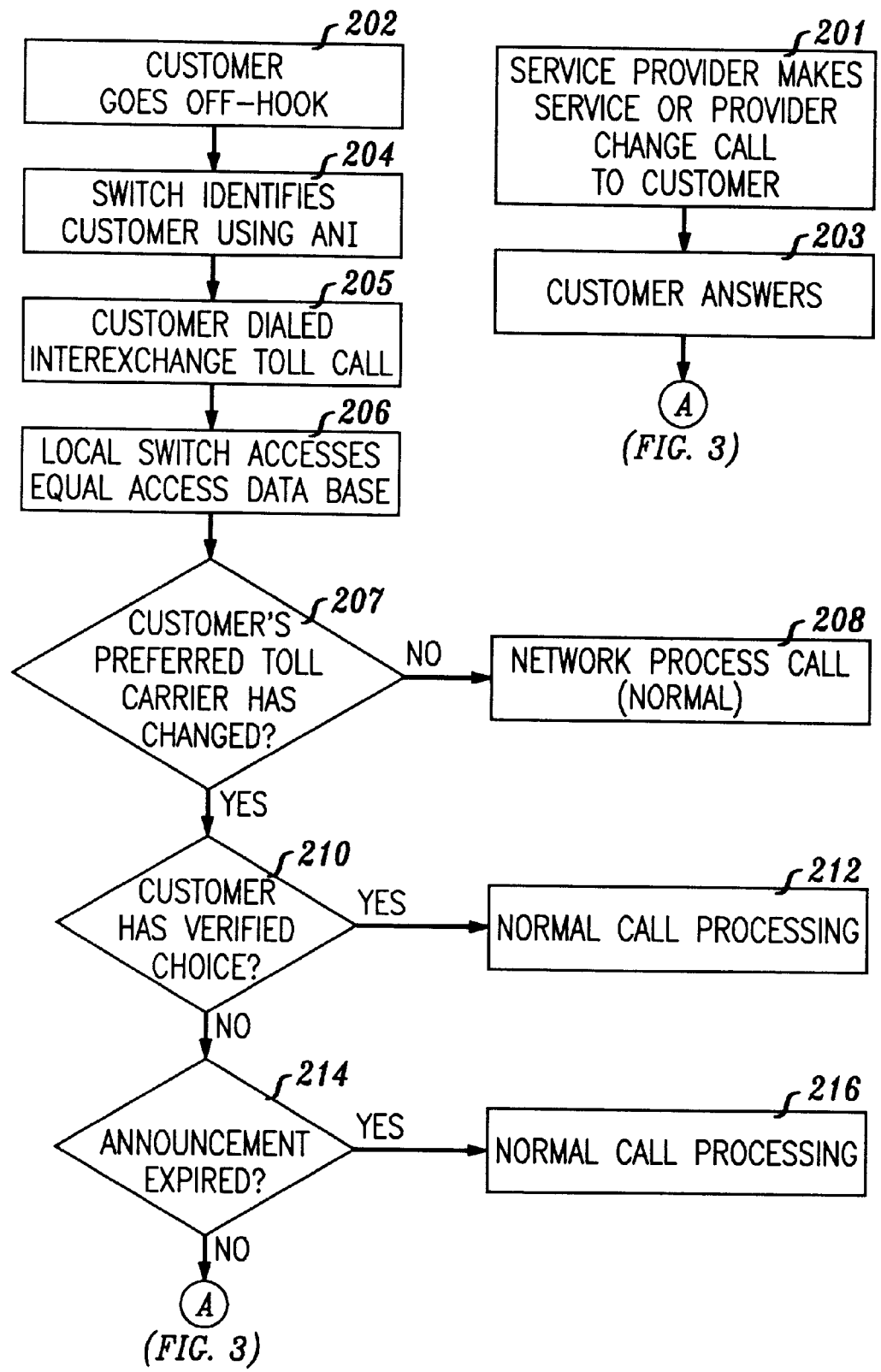
FIGS. 2–4 are flow diagrams illustrating the method of applicant's invention.
Figure 3:
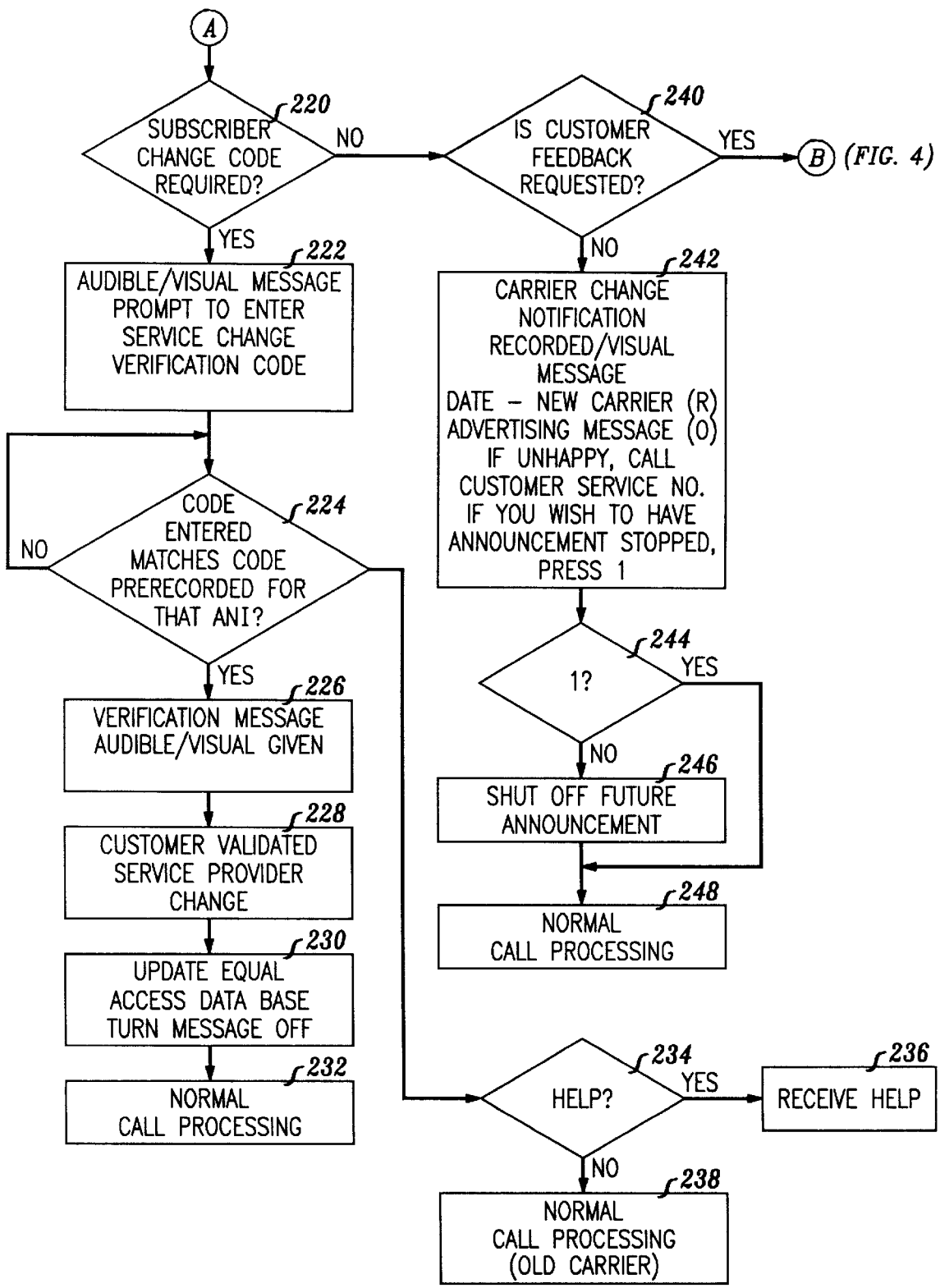
Figure 4:
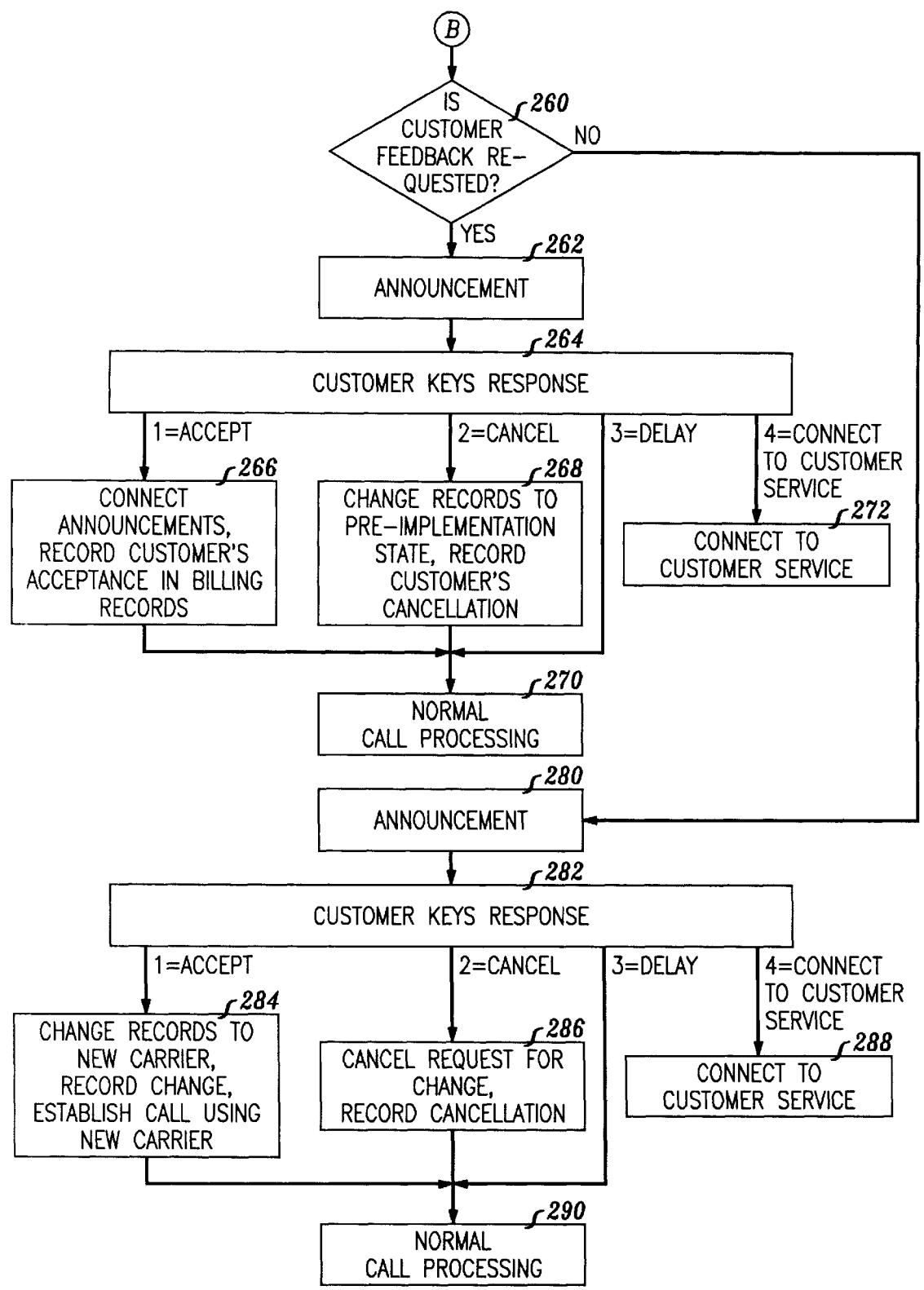

FIGS. 2–4 are flow diagrams illustrating the operation of applicant's invention. The first block of FIG. 2 indicates that the customer has gone off hook (action block 202). A local access switch identifies the customer using the well-known technique of automatic number identification (ANI) (action block 204). The number of the customer is used subsequently by processor 12 of local access switch 3 to access the equal access data base 16 in order to determine which interexchange carrier should carry the call.

Next, the local access switch 3 determines that the customer has dialed an interexchange toll call (action block 205). As noted above, similar kinds of provisions can be made for local exchange toll calls.

In the future, simple local calls may be served by either the local telephone company, a cable TV service provider, or local wireless server. Selection of the preferred carrier for simple local calls may be made in customer premise equipment (e.g., the set top box used for cable TV), which is programmable externally by one of these carriers. Similar needs exist to notify the customer, if their local preferred service provider selection has changed, no matter how.

For emergency calls ("911"calls), all special announcements, including those of applicant's invention, are bypassed.

The local switch then accesses the equal access data base (action block 206). The data received from this data base is then examined to determine whether the customer's preferred toll carrier has changed (test 207). If not, then the switch and telecommunications network processes the call normally as in the prior art (action block 208).

If the preferred toll carrier has changed, then test 210 determines whether the customer has validated the choice of the changed carrier. If so then the call is processed normally as in the prior art (action block 212). If the customer has not validated the choice, then test 214 is used to determine whether the announcement period has expired and/or number of announcements specified for this customer or for this switch has been reached. If the time interval has expired and/or the number of announcements has been reached, then the call is processed normally as in the prior art (action block 216). Otherwise test 220, which appears in the beginning of FIG. 3, is entered.

The above description is for the situation in which an interchange toll carrier is being changed. Essentially, the same flow diagram may be used for other changes of telecommunications carriers or service. For other types of service provider or service changes, the same arrangement can be used, and can be triggered by any telephone service request.

Alternatively, for other changes of service provider or service, a call to the customer is initiated by the old or new service provider (action block 201). After the customer answers (action block 203), the subsequent interactions between a call processing system and the customer are essentially the same, except that no toll call is completed since the customer did not initiate such a call.

Test 220 is used to determine whether data for validation (a validation code) from the subscriber is required. This option is likely to be an option for a particular switch or, effectively, a particular local exchange carrier, or may be mandated by rules of a regulatory body. It is also possible that in a particular switch, the validation code would be required for some carriers but not for others. At any rate if such a validation code is required, then an audible or visual message or prompt is returned to the caller asking that the validation code be supplied (action block 222). Such a validation code would be given to the customer by the new interexchange carrier at the time that the customer agrees to change interexchange carriers; for other applications, the validation code can be supplied at the time that the caller agrees to make whatever other change is being considered. Test 224 checks whether the code entered by the caller matches a code previously recorded for that particular customer. If there is no match, the caller is reprompted and given another chance. If the caller consistently fails to enter the correct code the customer receives a prompt for help (action block 233). Test 234 is used to determine whether the customer wants help, if not, the call is processed normally using the old carrier (action block 238). If the customer does request help then the customer receives the help (action block 236). In the preferred embodiment the help is provided through a connection to a customer service representative. Alternatively, help may be provided through an oral or displayed menu, and visual or voice prompting, with DTMF or voice response, and, probably, an operator default.

If the code matches, then a verification message is given to the caller either through an audible announcement or through data for controlling a display at the caller's telephone (action block 226) and the system recognizes that it has a customer validated service provider change (action block 228). The equal access data base is then updated to indicate that the customer is now being served by the new interexchange carrier and the message is turned off so that the customer will not receive subsequent announcements or messages about the change of interexchange carrier (action block 230). Thereafter, normal call processing of the call that was dialed proceeds (action block 232).

If no validation code is required (negative result of test 220) then test 240 is used to determine whether customer feedback is requested. Test 240 has the same basic characteristic as test 220, namely, it is likely to be provided as an option in a particular local access switch or at the request of the new carrier. If no feedback is requested then the carrier change notification is provided in audible or visual form to the caller (action block 242). In the preferred embodiment the notification would include the date of the requested activation of the change to the new carrier, an optional advertising message, probably for the new carrier, and an indication that if the customer is unhappy about the switch, he/she should call a specified customer service number. Additionally, such an announcement might include a message from the old carrier effectively conveying some inducement to encourage the customer to cancel the change request or warning the customer of the drawbacks and/or costs of making the change. In addition, this message also has an indication that if the customer wishes to have the announcement stopped, i.e., if the customer is happy with the change and does not want to be annoyed with further announcements, the customer can stop the announcements through the act of keying a 1. Test 244 then checks whether a 1 has been keyed. If so the announcement is shut off (action block 246), the switch to a new carrier is effectively validated, and the customer will not get further announcements. Thereafter, the call is processed normally (action block 248). If the customer does not key in a 1, then the actions of block 246 are bypassed and the call is simply processed normally (action block 248).

The announcement is selected for the customers experiencing a specific change. Therefore the announcement can include such details as the fact that the customer is being given a trial service which requires acceptance in order to be continued, that the customer's service is up for renewal and requires re-validation, or that the carrier would like to receive feedback concerning the service from the customer (such an announcement would include a telephone number of an operator or automatic voice/data entry system for the feedback).

The case in which customer feedback is requested is covered in FIG. 4 which begins with decision block 260. Decision block 260 is used to determine whether the customer's service provider has already been changed. This decision block has the same characteristic as decision blocks 220 and 240, namely that it is basically at the discretion of the local exchange carrier operating the local access switch, or the keeper of the equal access data base. (In this case it would be in the interest of the changed-to carrier to change the service as quickly as possible so that if that carrier specified the outcome of decision block 260, the "yes" leg is most likely to be requested.)

If the outcome of decision block 260 is positive, then action block 262 provides an announcement indicating the change of carrier, the identity of the new carrier, and providing options to the caller. The options are summarized in action block 264 and include: 1 (accept the change); 2 (cancel the change); 3 (delay the decision); and 4 (connect to customer service because the caller is confused). The default in case the caller keys nothing is also a connection to customer service. In case the caller keys a 1, then announcements are canceled and a record is made of the customer's acceptance in billing records for that caller (action block 266). If the caller keys a 2 requesting a cancellation of the change, then the records are changed to the pre-implementation state so that the customer will subsequently be served by the previous interexchange carrier, and a record is made in the billing records to indicate that the customer has canceled the request (action block 268). If the customer keys a 3, then the call is simply sent to normal call processing (action block 270) and the caller will receive an announcement the next time that the caller dials an interexchange toll call. If the customer keys a 4 or does nothing (timeout), then the customer is automatically connected to a customer service representative (action block 272). (If the caller calls at a time when no customer service representatives are available, the customer will receive an announcement indicating the number to call when service representatives are available.) Appropriate announcements (not shown) can also be provided if the customer keys a validation or cancellation code. The announcements for the validation or cancellation code may include an advertisement and/or warning of costs and benefits lost as a result of the switch or failure to go through with the change, respectively.

In this specific embodiment, four responses, namely keyed 1, 2, 3, or 4 are shown. In alternative embodiments, a larger number of more detailed responses can be used. For example, a validation response might be a two or three character code to ensure that validation is not accidental. A feedback loop to ensure the intentional character of the customer's validation or cancellation, and to give a customer another chance if the validation response is incorrect, enhances the reliability of the procedure.

In case the result of test 260 is that the service provider has not yet been changed, in anticipation of input from the caller then the caller receives an announcement (action block 280) which is essentially the same kind of announcement received in action block 262. The customer then keys a response (action block 282). If the customer has keyed a 1 indicating an acceptance, then the records are changed to show that the new carrier is the preferred carrier and the call is established using the new carrier (action block 284) and normal call processing proceeds (action block 290). If the customer keys a 2 indicating a cancellation of the earlier request then the request for change is canceled; a record is made of the cancellation in billing records and the caller will receive no more announcements (action block 286). Thereafter, the call is established using normal call processing (action block 290). If the caller keys a 3 indicating a delay in the decision, then the call will be processed conventionally (action block 290) using the indicated interexchange carrier which in this case will be the old carrier. If the customer keys in a 4 then the customer is connected to a customer service representative (action block 288). The customer is also connected to a customer service representative (action block 288) if the customer does nothing (timeout) or keys some undefined response. If the customer is to be connected to a service representative, the customer may select, based on keyed information, either a representative of a regulatory agency (to register a complaint), a local exchange carrier, the old preferred toll carrier, or the new preferred toll carrier.

FIG. 5 illustrates some of the data maintained for customers in the equal access data base in accordance with applicant's invention. This data includes the automatic number identification of that customer, the identity of the old and the new preferred carrier, e.g., the carrier interconnect codes of the old and new preferred carriers, an indication of the number of the announcements already given to the caller, an indication of the date of change requested by the caller, an indication of the date of acceptance of the change by the caller, the status of the change (i.e., whether or not the change has in fact been made so that the customer is expected to be served by the new preferred carrier and whether the customer has already approved of such a change), and the code number supplied to that customer by the new carrier for verifying the customer's intention to make the change.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of notifying a customer of a change of preferred toll carrier, comprising the steps of:
    receiving a toll call request from said customer;
    testing whether a recent request for a change of preferred toll carrier has been made for said customer; and
    if the recent request for a change has been made, returning an indication of said recent request including an identity of the preferred toll carrier to said customer.

2. The method of claim 1 wherein the step of returning an indication comprises the step of returning an announcement to an analog telephone without display.

3. The method of claim 1 wherein the step of returning an indication comprises the step of returning an indication for display in a telephone having display capabilities.

4. The methods of claim 1 further comprising the steps of:
    prior to returning the indication of said request, said customer supplying data for validation of the request for a change to said customer;
    responsive to receiving said indication of said request, returning an indication of validation from said customer; and
    wherein the step of returning an indication of said request comprises the step of returning the indication of said request only if the step of returning an indication of validation has not been performed previously by said customer.

5. The method of claim 4 wherein the step of returning an indication of validation comprises the step of keying a validation number comprised in said data for validation previously supplied to said customer.

6. The method of claim 4 wherein the step of returning an indication of validation comprises keying a response to a prompt message.

7. The method of claims 1 or 2 further comprising the step of;
    canceling the request for a change by keying data from the telephone station of said customer in response to a prompt.

8. The method of claim 1 further comprising the step of:
    responsive to signals received from said customer, connecting said customer to a service representative.

9. The method of claim 8 wherein the step of connecting comprises:
    receiving a signal from said customer specifying one of a plurality of types of service representatives.

10. The method of claim 9 wherein the step of receiving a signal comprises:
    receiving a signal from said customer specifying one of a customer representative from a service provider for which a request to change from has been made and a customer representative for a service provider for which a request to change has been made.

11. A method of notifying a customer of a change of service provider or service, comprising the steps of:
    receiving a telephone service request from said customer;
    testing whether a recent request for a change of service or service provider has been made for said customer;
    if the recent request for such a change has been made, returning an indication of said recent request, including an identity of the service provider to said customer, wherein data for a validation of the request for a change is supplied to said customer prior to returning the indication of said request;
    responsive to receiving said indication of said request, returning an indication of validation from said customer; and
    returning the indication of said request only if the step returning the indication of validation has not been previously performed by said customer.

* * * * *